Dec. 15, 1936.    G. A. LUBURG    2,064,673
COLLAPSIBLE TURTLEBACK
Filed Dec. 14, 1934    2 Sheets-Sheet 1

INVENTOR.
GUY A. LUBURG.
BY
ATTORNEYS.

Dec. 15, 1936.   G. A. LUBURG   2,064,673
COLLAPSIBLE TURTLEBACK
Filed Dec. 14, 1934   2 Sheets-Sheet 2

INVENTOR.
GUY A. LUBURG.
BY
ATTORNEYS.

Patented Dec. 15, 1936

2,064,673

UNITED STATES PATENT OFFICE 2,064,673

COLLAPSIBLE TURTLEBACK

Guy A. Luburg, Snyder, N. Y., assignor, by mesne assignments, to Curtiss-Wright Corporation, a corporation of New York Application December 14, 1934, Serial No. 757,432

9 Claims. (Cl. 244—121)

This invention relates to aircraft, and is particularly concerned with improvements in aircraft fuselage construction.

An object of the invention is to provide an improved fairing construction for the top surface of an aircraft fuselage.

A further object is to provide a collapsible deck for the rearward portion of an aircraft fuselage.

Another object is to provide an improved cabin organization for aircraft which are at times operated as cabin aircraft, and are at times operated as open cockpit aircraft.

A further object is to provide, in an aircraft having cabin closures over the open cockpits thereof, a rearwardly extending collapsible fairing which, when extended, forms a substantially streamlined extension for the cabin closure, and which when folded, permits an occupant of a cockpit, such as a gunner, to have a wide field of vision rearward of the cockpit.

Further objects will become apparent in reading the annexed specification and in viewing the drawings, in which.

In the construction of military aircraft of the high speed type, it has been found desirable to build these aircraft basically with an open cockpit fuselage, in order that the crew be given the widest possible range of vision from all angles. In these high speed craft, however, cabin closures for the open cockpits are frequently provided to give protection to the aircraft crew on long flights and against adverse weather. Patent Number 1,939,501 to Hathorn shows three types of cabin closures in detail. In the present invention, I contemplate the provision of a forward cockpit closure organized for rearward sliding, the front cockpit being normally occupied by the pilot. The rearward cockpit is likewise provided with a cabin closure which may be slid forwardly along the fuselage to permit the occupant, such as a gunner or a cameraman, to have access with his equipment through as complete a range as possible. Ordinarily, as shown in said prior patent, the rearward edge of the rearward closure cannot well be provided with a streamlined rearwardly extending fairing to permit of smooth air flow and greater speed of the craft, since such a fairing would interfere with the aiming of the gun in a rearward direction. This invention provides a collapsible fairing, or "turtleback", as it is sometimes called, which, when the cabin closures are in their closed position, may be extended upwardly to provide a rearwardly extending fairing for the cabin closure. However, when it is desired to operate a gun or other equipment requiring wide range of action, the fairing may be collapsed so that the occupant of the rear cockpit may actuate his gun or other equipment with the complete freedom and without interference from the streamlined fairing.

Figure 1:
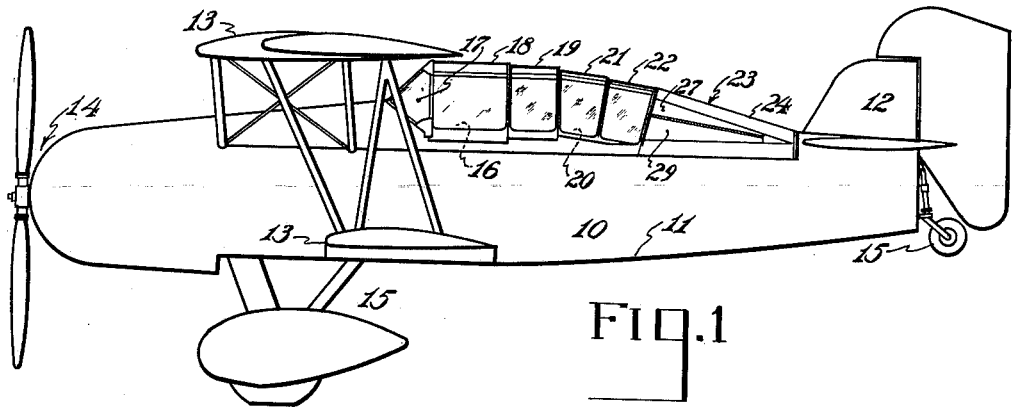
Fig. 1 is a side elevation of an aircraft equipped with the device of this invention.

The particular embodiment which I have illustrated is shown as applied to an aircraft 10 comprising a fuselage 11 having the usual empennage 12, wings 13, power plant 14 and landing gear 15. A forward cockpit 16 in the fuselage is provided with a windshield 17 and a rearwardly sliding closure 18 which may, when rearwardly moved, telescope over a central stationary closure portion 19. A rear cockpit 20 in the fuselage, located aft of the closure portion 19, is covered by a forwardly movable closure 21 which may telescope within the closure portion 19. As shown, a secondary rear closure 22 is provided which may be moved forwardly within the closure 21. Thus, when the closure 18 is slid forwardly and the closures 21 and 22 are slid rearwardly, both cockpits 16 and 20 are completely covered and comprise a tight cabin, the outer contour of which effectively carries out the desired streamline contour of the fuselage. Rearward of the closure 22 is a turtleback 23, the forward edge of which matches with the rearward edge of the closure 22, and the rearward portion of the turtleback blends into the fuselage 11 just forward of the empennage 12. The turtleback 23 in the position shown in Figs. 1 and 2, carries the streamline conformation of the several closures. An occupant of the cockpit 20, presumably a gunner, will necessarily have to open one or more of the closures 21 and 22 when he wishes to operate his gun. Likewise, in order to be able to aim the gun rearwardly, it will be noted that the turtleback 23, when in the position shown in Figs. 1 and 2, would interfere with such rearward aiming. The turtleback is therefore constructed to collapse to the position shown in Fig. 3, wherein the top deck thereof is substantially horizontal and flush with the normal upper edges of the fuselage 11.

Figure 3:
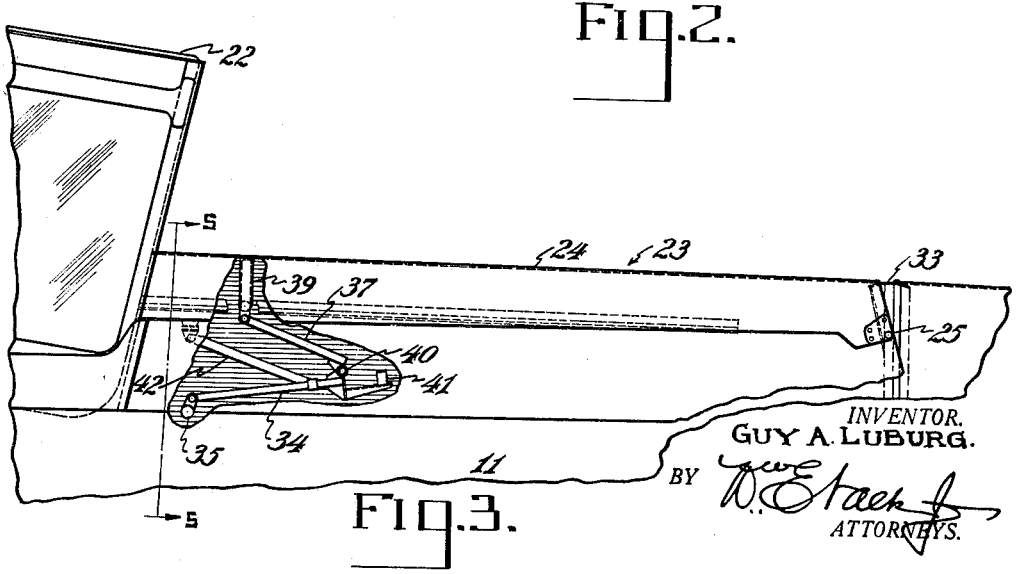
Fig. 3 is a view similar to Fig. 2, showing the collapsible fairing in its folded position.
Figure 4:
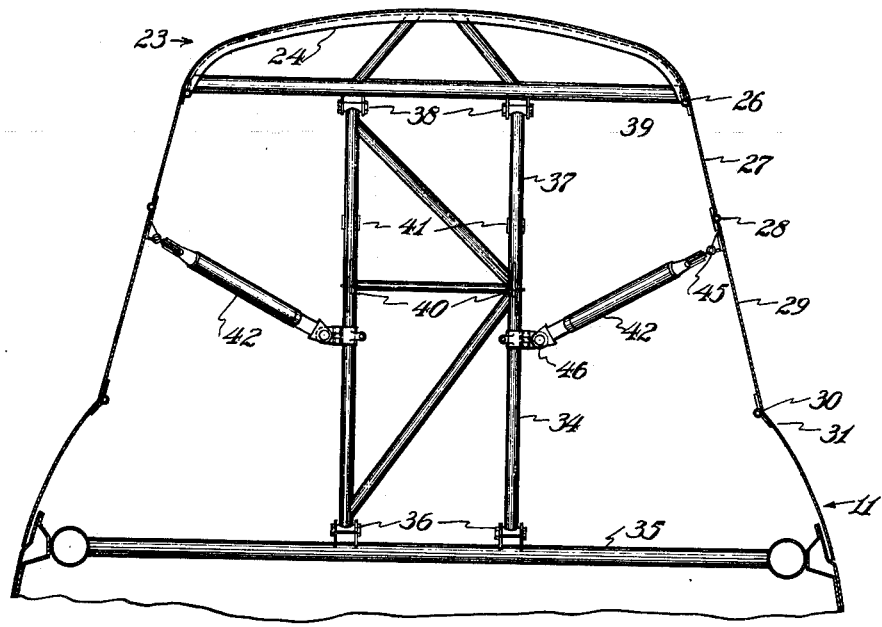
Fig. 4 is a section on the line 4—4 of Fig. 2.
Figure 5:
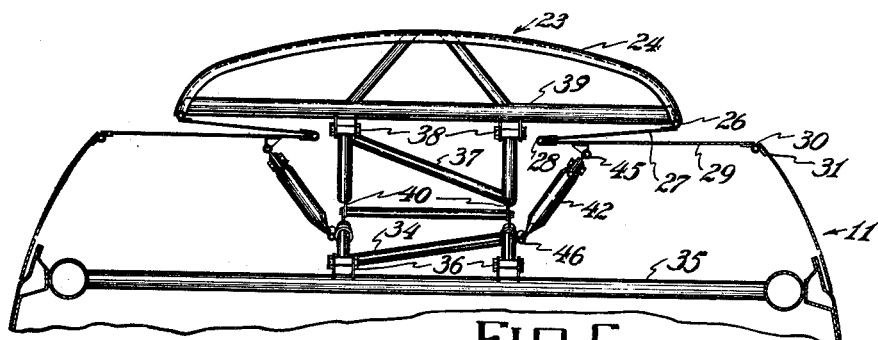
Fig. 5 is a section on the line 5—5 of Fig. 3.
Figure 6:
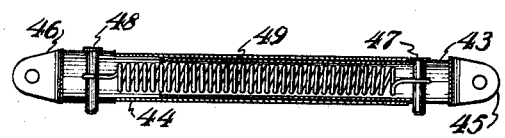
Fig. 6 is an enlarged section of a portion of the collapsible fairing.

The structure comprising the turtleback 23 comprises an upper deck portion 24 hinged at its rearward end at 25 to the structure of the fuselage 11. Preferably, the deck is formed with a semi-elliptic cross section, as shown in Figs. 4 and 5, this shape being substantially the same as the cross section of the top portion of the cockpit closure 22. Each lateral edge of the deck 24 is provided with a piano type hinge 26 which is joined to a triangular fairing strip 27. This strip, along its lower edge, is provided with a piano type hinge 28 to which a second substantially triangular fairing strip 29 is attached. The lower edge of the strip 29 is joined, by a piano type hinge 30 to the upper edge of the fuselage covering, as at 31. It will be noted in Figs. 4 and 5 that the covering of the rearward portion of the fuselage terminates at the hinges 30, providing a substantially full width opening across the top of the fuselage. This opening, of course, is closed by the combined deck 24 and fairings 27 and 29. The hinges 26, 28 and 30 are so arranged that the turtleback 23 may be swung downwardly about the pivots 25 upon which the fairings 27 and 29 fold inwardly to the position shown in Fig. 5, whereupon the deck 24 takes a substantially horizontal position as shown in Fig. 3. The rearward portion of each fairing 29 is provided with an upwardly extending tab 32 extending from the axis of the hinge 30 in an overlapping relationship to the edge of the deck 24, so that it is unnecessary to extend the hinges 26 and 28 to what would be their normal point of intersection at the pivots 25. Thus, each hinge 26, 28 and 30 is permitted full action and no relative interference accrues. The covering of the fuselage 11, rearward of the deck 24, is formed with an arcuate portion 33 concentric with the pivot 25, so that a substantially complete closure exists between the deck 24 and the fuselage covering regardless of whether said deck be in its raised or folded position.

Figure 2:
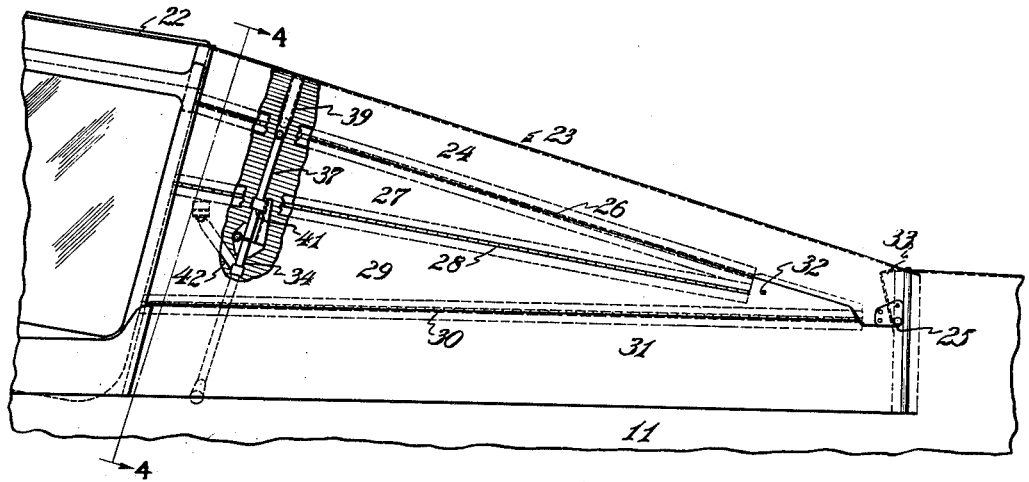
Fig. 2 is an enlarged side elevation of a portion of Fig. 1, showing the collapsible fairing of this invention in an extended position.

In order to firmly hold the turtleback in either a completely extended or completely folded attitude, a frame 34 is pivoted to a fuselage cross member 35 at 36, and a second frame 37 is pivoted at 38 to a truss 39 attached to the deck 24, and is likewise pivoted at its lower end, at 40, to the upper end of the frame 34. As shown in Figs. 2 and 3, the pivot 40 is forwardly offset from the planes of the frames 34 and 37, and a clip 41 is carried by the frame 34 which is adapted to snap around the upright elements of the frame 37 to hold the two frames in substantial alignment when the deck 24 is raised. The offset of the pivots 40 serves to rigidly hold the frames in their aligned attitude. A rearward push upon the frames permits them to buckle, whereupon the deck 24 is lowered.

A pair of spring devices 42 are provided to urge the turtleback toward a collapsed position, these devices 42 comprising telescoping tubes 43 and 44 having fittings 45 and 46 pivoted respectively to the fairings 29 and the frames 34. Pins 47 and 48 respectively pass through the tubes 43 and 44 and a spring 49 is anchored at its ends to said pins, thereby tending to pull the fittings 45 and 46 toward each other. The points of attachment of the fittings 45 and 46 to the fairing 29 on the frame 34 are so arranged that the spring 49 is under tension regardless of the position of adjustment of the turtleback. When the frame is pulled forwardly to extend the turtleback, the clips 41 engage the frame 47 to resiliently hold the turtleback extended.

The frames 34 and 37 provide a quick and convenient means for operating the turtleback, the frames being readily reached by an occupant of the rear cockpit 20. In either position of adjustment, the contour of the fuselage 11 is maintained smooth to interfere as little as possible with the speed of the craft.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim:

1. In aircraft, a fuselage having a cockpit, a transparent cockpit closure extending above said fuselage and slidable therealong to open and close said cockpit, a fuselage deck hinged at its rearward end to said fuselage, whereby the forward end of said deck is movable to a raised position substantially coplanar with the top of said closure when in a cockpit closing position, and to a position wherein said deck is substantially coextensive with the upper edges of said fuselage, and foldable means between said fuselage edges and the lateral edges of said deck for fairing said deck into said fuselage when said deck is raised.

2. In aircraft, a fuselage having a cockpit, a transparent cockpit closure extending above said fuselage and slidable therealong to open and close said cockpit, a fuselage deck hinged at its rearward end to said fuselage, said deck having a raised position wherein it forms a rearwardly extending substantially streamlined continuation of said cockpit closure, and having a lowered position wherein the deck lies substantially adjacent the upper elements of said fuselage.

3. An aircraft including a collapsible covering portion, said portion comprising collapsible fairings movable relative to said aircraft, a deck hinged at its edges to said fairings and hinged at one end to said aircraft, and means for moving said deck and fairings between positions substantially flush with, and raised from, said aircraft, said deck when raised being acutely angled relative to said aircraft.

4. In an aircraft body having an elongated opening, a movable cover portion for said opening hinged at one end to an end edge of said opening and tapering toward said cover hinge, fairing strips hinged to the edges of said cover, additional fairing strips tapering toward said cover hinge and hinged to said body adjacent the border of said opening, hinges connecting the respective fairing strips, and means to collapse said strips inwardly upon movement of said cover toward said body, said cover being adapted to move from and toward said fuselage.

5. In aircraft, a fuselage having a cockpit and a raised closure thereover extending substantially to the rearward cockpit edge, a deck hinged to said fuselage remote from the rearward cockpit edge, swingable between a position level with said fuselage and a position wherein said deck forms a rearward streamline continuation of said raised closure, and collapsible panels between the edges of said deck and said fuselage adapted, when deck is raised, to form lateral streamline continuations for the sides of said raised closure.

6. In an aircraft fuselage, a streamline deck hinged at an end thereto and extending longitudinally from the deck hinge, said deck being movable to raised and lowered positions, said deck when raised lying in acutely angled relationship to said fuselage and when lowered lying substantially level with the surface of said fuselage, and collapsible elements hinged to the sides of said deck and fuselage forming gussets between said deck and the fuselage when said deck is raised.

7. In an aircraft body having an elongated opening, a movable cover portion for said opening hinged at one end to an end edge of said opening, fairing strips tapering toward said cover hinge, hinged to the edges of said cover, additional fairing strips tapering toward said cover hinge and hinged to said body adjacent the border of said opening, and hinges connecting the respective fairing strips, said cover being adapted to move from and toward said fuselage.

8. A fuselage deck hinged at one end to said fuselage and swingable from a position substantially level with said fuselage to a raised position wherein said deck is acutely angled relative to said fuselage, and a buckling strut hinged to said deck and fuselage at the free end of said deck for controlling the swinging thereof.

9. A fuselage deck hinged at one end to said fuselage and swingable from a position substantially level with said fuselage to a raised position wherein said deck is acutely angled relative to said fuselage, a buckling strut hinged to said deck and fuselage at the free end of said deck for controlling the swinging thereof, tapering, buckling fairings hinged at their edges to the deck and fuselage edges, and links connecting said fairings with said buckling strut for controlling buckling movement of said fairings in response to movement to said buckling strut.

GUY A. LUBURG.